United States Patent
Babineau, Jr. et al.

(10) Patent No.: US 7,899,655 B2
(45) Date of Patent: Mar. 1, 2011

(54) METHOD OF PREDICTING AND COMMUNICATING THE PERFORMANCE OF AN INSTALLED BUILDING COMPONENT BASED ON THE TRANSIENT HYGROTHERMAL BEHAVIOR OF THE COMPONENT

(75) Inventors: Francis John Babineau, Jr., Parker, CO (US); Marcus Vinicius Andrade Bianchi, Littleton, CO (US); Reed Harvey Larson, Parker, CO (US); Norman Douglass Fast, Littleton, CO (US); Thomas John Fellinger, Littleton, CO (US); Raymond W. Lavallee, II, Littleton, CO (US)

(73) Assignee: Johns Manville, Denver, CO (US)

( * ) Notice: Subject to any disclaimer, the term of this patent is extended or adjusted under 35 U.S.C. 154(b) by 584 days.

(21) Appl. No.: 11/728,774

(22) Filed: Mar. 27, 2007

(65) Prior Publication Data
US 2008/0243444 A1    Oct. 2, 2008

(51) Int. Cl.
G06G 7/56     (2006.01)
G06G 7/50     (2006.01)
G06F 9/45     (2006.01)

(52) U.S. Cl. .................................. 703/5; 703/9; 703/22
(58) Field of Classification Search .................... 703/5, 703/7, 22
See application file for complete search history.

(56) References Cited

U.S. PATENT DOCUMENTS

| | | | |
|---|---|---|---|
| 2,017,376 A | 10/1935 | Rother et al. | |
| 2,134,067 A | 10/1938 | Wickersham et al. | |
| 2,343,340 A | 3/1944 | Stevens | |
| 3,209,247 A | 9/1965 | Mead et al. | |
| 3,354,388 A | 11/1967 | Perry | |
| 3,523,243 A | 8/1970 | Wagner | |
| 4,468,610 A | 8/1984 | Hanson | |
| 4,845,421 A | 7/1989 | Howarth et al. | |
| 6,377,181 B1 | 4/2002 | Kroll et al. | |
| 6,674,292 B2 | 1/2004 | Bray et al. | |
| 6,798,220 B1 | 9/2004 | Flanigan et al. | |
| 2002/0130781 A1 | 9/2002 | Kroll et al. | |

(Continued)

OTHER PUBLICATIONS

Achilles Karagiozis, Mikael Salonvaara, "Hygrothermal system-performance of a whole building", 2001, Pergamon, Building and Environment 36, p. 779-787.*

(Continued)

*Primary Examiner*—Kamini S Shah
*Assistant Examiner*—Angel J Calle
(74) *Attorney, Agent, or Firm*—Robert D. Touslee

(57) ABSTRACT

A method of predicting and communicating transient hygrothermal behavior of an installed building component in a building wherein an interior environment of the building is materially affected by an environment exterior of the building, includes: defining a performance characteristic of the building component that is affected by transient hygrothermal behavior of the building component; defining exterior and interior climatic factors that affect the defined performance characteristic wherein the interior climatic factors are a function of the exterior climatic factors; and defining one or more non-climatic factors that affect the defined performance characteristic. Inputting these factors into a transient hygrothermal simulation software program to create a software model for performing simulations which predict changes in the defined performance characteristic, as a function of time, that are compared with a threshold performance characteristic value, to provide a user guide.

17 Claims, 4 Drawing Sheets

U.S. PATENT DOCUMENTS

2003/0187579 A1* 10/2003 Sedlbauer et al. ............... 702/3
2007/0015424 A1* 1/2007 Toas et al. ..................... 442/59

OTHER PUBLICATIONS

J. E. Ephrath, J. Goudriaan and A. Marani, "Modelling Diurnal Patterns of Air Temperature, Radiation, Wind Speed and Relative Humidity by Equations from Daily Characteristics", 1996, Elsevier, Agricultural Systems, vol. 51, No. 4, p. 377-393.*

A. Hukka, H. A. Viitanen, "A mathematical model of mould growth on wooden material", Wood Science and Technology 33, 1999, p. 475-485.*

Iain Alexander Macdonald, "Quantifying the Effects of Uncertainty in Building Simulation",Thesis, Department of Mechanical Engineering University of Strathclyde, Jul. 2002.*

Hyeun Jun Moon, Assessing Mold Risk in Building under Uncertainty, Thesis, Georgia Institute of Technology, Aug. 2005.*

E. J. Burke and L. P. Simmonds, "A simple parameterisation for retrieving soil moisture from passive microwave data", 2001, Hydrology and Earth System Science 5, p. 39-48.*

S. Citherlet, J. Hand, "Assessing energy, lighting, room acoustics, occupant comfort and environmental impacts performance of building with a single simulation program", Building and Environment 37 (2002).*

* cited by examiner

METHOD OF PREDICTING AND COMMUNICATING THE PERFORMANCE OF AN INSTALLED BUILDING COMPONENT BASED ON THE TRANSIENT HYGROTHERMAL BEHAVIOR OF THE COMPONENT

BACKGROUND OF THE INVENTION

The subject invention relates to a method for predicting and communicating the transient hygrothermal behavior and performance of installed building components. The method includes inputting unique inputs into a commercially available transient hygrothermal simulation software program to create a highly unique and useful software model for predicting, as a function of time, the transient hygrothermal behavior (e.g. the moisture content) of an installed building component (e.g. an installed building material or installed building material assembly) in a building where the interior environment of the building is materially affected by the exterior environment such as but not limited to an unfinished building without a working heating, ventilating, and air conditioning system (HVAC system). The method of the subject invention further relates to the technique of utilizing of the created transient hygrothermal behavior software model with regard to one or more defined performance characteristics of an installed building component as a guide to evaluate the performance of an installed building component so that the performance of the building component and/or other building component(s) in contact with or adjacent the building component will not be adversely affected by the hygrothermal behavior of the building component. While the method of the subject invention can be used for numerous applications, one specific application for which the method of the subject invention is particularly well suited is the determination of when the transient moisture content of a moisture containing building component (e.g. a damp spray-in insulation) installed in a wall, ceiling, floor, or roof of an unfinished building permits the enclosure and sealing of the installed building component within the wall, ceiling, floor, or roof without adverse consequences related to the moisture content of the installed building component.

As discussed on the web page of the Building Technology Center of the Oak Ridge National Laboratory entitled "Software/WUFI-ORNL/IBP/Introduction", in addition to the thermal properties of a building component and the impact of those thermal properties on heating losses, the hygric behavior of building components should also be considered in connection with building construction.

For example, permanently increased moisture content in an installed building component, such as but not limited to building insulation, may result in moisture damage to or reduced performance of the building component and/or other building components in contact with or adjacent the building component, such as but not limited to dry wall boards, wooden framing members, etc. and may also result in elevated surface moisture levels in living rooms that can lead to hygienic problems and health risks due to mold growth. With regard to building component performance, the thermal and hygric behavior of a building component are closely interrelated in that increased moisture content favors heat losses and thermal conditions affect moisture transport. Through hygrothermics, the thermal properties and hygric behavior of building components and the mutual interdependence of the thermal properties and hygric behavior of building components can be determined and appropriate measures taken to assure that installed building components do not permanently retain a moisture content that can materially and adversely affect the performance of the building component, degrade the building component or adjacent building components, or cause hygienic problems.

One simulation tool for predicting the transient hygrothermal (heat and water) behavior of installed building components is the commercially available WUFI hygrothermal software package (Fraunhofer Institut Bauphysik). This software package outputs temperature, water content, and relative humidity in various components of a building assembly defined by the user of the software package. In a typical simulation using this software package, the building assembly is exposed to a simulated climate on its exterior facing side based on collected climate data for many regions around the world and a simulated interior environment assumed to be controlled and held at a near-constant temperature and humidity normal for a HVAC system. While the above exterior climate and interior environment inputs may be acceptable for simulating certain applications with this type of software, there has remained a need for predicting the transient hygrothermal behavior of installed building components in building construction applications where the interior environment is not controlled and maintained at a near-constant temperature and humidity such at that normally maintained by a HVAC system. An example of such an application occurs in residential building construction wherein while the building is under construction, many building components of the building envelope may be assembled before the HVAC system is operational. In such a situation, the local climate can impact both the exterior and the interior sides of installed building component(s) whereby transient hygrothermal simulations based on a simulated interior environment that is assumed to be controlled and held at a near-constant temperature and humidity normal for a HVAC system would inaccurately predict the transient hygrothermal behavior of the installed building component(s). Such inaccuracies in the transient hygrothermal behavior of the installed building component(s) could produce adverse consequences. In the method of the subject invention, simulations for predicting the transient hygrothermal behavior of installed building components in buildings where the interior environment is not maintained at a near-constant temperature and humidity normal for a HVAC system (e.g. residential and other buildings under construction or renovation where the HVAC is not operational) are produced that accurately predict the transient hygrothermal behavior of installed building components in such an application for specific building design and climate locations as well as a broad range of building designs and climate conditions.

SUMMARY OF THE INVENTION

In the method of the subject invention, the transient hygrothermal behavior of an installed building component (e.g. a building material or building material assembly such as but not limited to a building insulation or building insulation assembly) is predicted for a building wherein the interior environment of the building is materially affected by the exterior environment, such as but not limited to an unfinished building structure that is not maintained at near-constant temperature and humidity, such as that normal for a fully enclosed building structure with a working HVAC system. A software model for predicting the transient hygrothermal behavior of a building component is created by: defining one or more performance characteristics of a building component to be simulated by the software model that is affected by the transient hygrothermal behavior of the installed building component; defining exterior and interior climatic factors for the software model, which would affect the transient hygrothermal behavior of an installed building component, for creating exterior and interior climatic simulation ranges for a building structure wherein the interior climatic factors are a function of the exterior climatic factors; and defining one or more non-climatic factors for the software model affecting the transient hygrothermal behavior of an installed building component. The defined performance characteristic(s), exterior and interior climatic factors, and the one or more non-climatic factors are inputted into a commercially available transient hygrothermal simulation software program and a software model is created for performing simulations with the software program, which predicts the transient hygrothermal behavior of the defined performance characteristic(s), as a function of time, of an installed the building component. The predicted transient hygrothermal behavior of the defined performance characteristic(s) by the software program is based on one or more selected initial as installed, defined performance characteristic values (e.g. as installed moisture content value) of the building component; selected exterior and interior climatic factors within the created exterior and interior climatic simulation ranges of the software model; and selected non-climatic factors of the one or more non-climatic factors included in the software model. Utilizing the created software model, simulations are preformed with the software program to obtain outputs for the defined performance characteristic(s) of an installed building component (e.g. moisture content outputs), as a function of time, that are based on inputted initial as installed performance characteristic values (e.g. moisture content values) of the installed building component; inputted exterior and the interior climatic factors within the exterior and the interior climatic ranges of the software model, and inputted non-climatic factors of the one or more non-climatic factors included in the software model.

The method of the subject invention for predicting and communicating a transient state of a defined performance characteristic of an installed building component in a building structure based on the transient hygrothermal behavior of the installed building component, utilizes the above method for predicting the transient hygrothermal behavior of the installed building component. In addition, the method of the subject invention for predicting and communicating the performance of a building component based on one or more transient defined performance characteristics (e.g. transient water content) of an installed building component in a building structure based on the transient hygrothermal behavior of the installed building component includes defining a threshold performance characteristic value (e.g. a moisture content value) at or above which the defined performance characteristic of the installed building component would be expected to affect (typically materially affect) the performance of the building component and/or other building component(s) in contact with or adjacent the building component. The outputs, as a function of time, for the defined performance characteristic(s) of the installed building component (e.g. moisture content outputs) generated by the software program are then compared to the defined threshold performance characteristic value (e.g. defined water content value) to predict the performance of the installed building component, as a function of time, for an inputted initial as installed performance characteristic value (as installed moisture content value) of the installed building component, the inputted exterior and interior climatic factors within the exterior and interior climatic ranges, and the inputted non-climatic factors. The results of the method and analysis can be presented in a graphical or other convenient format for utilization by an insulation installer, homebuilder, code official or other user.

DETAILED DESCRIPTION OF THE INVENTION

Figure 1:
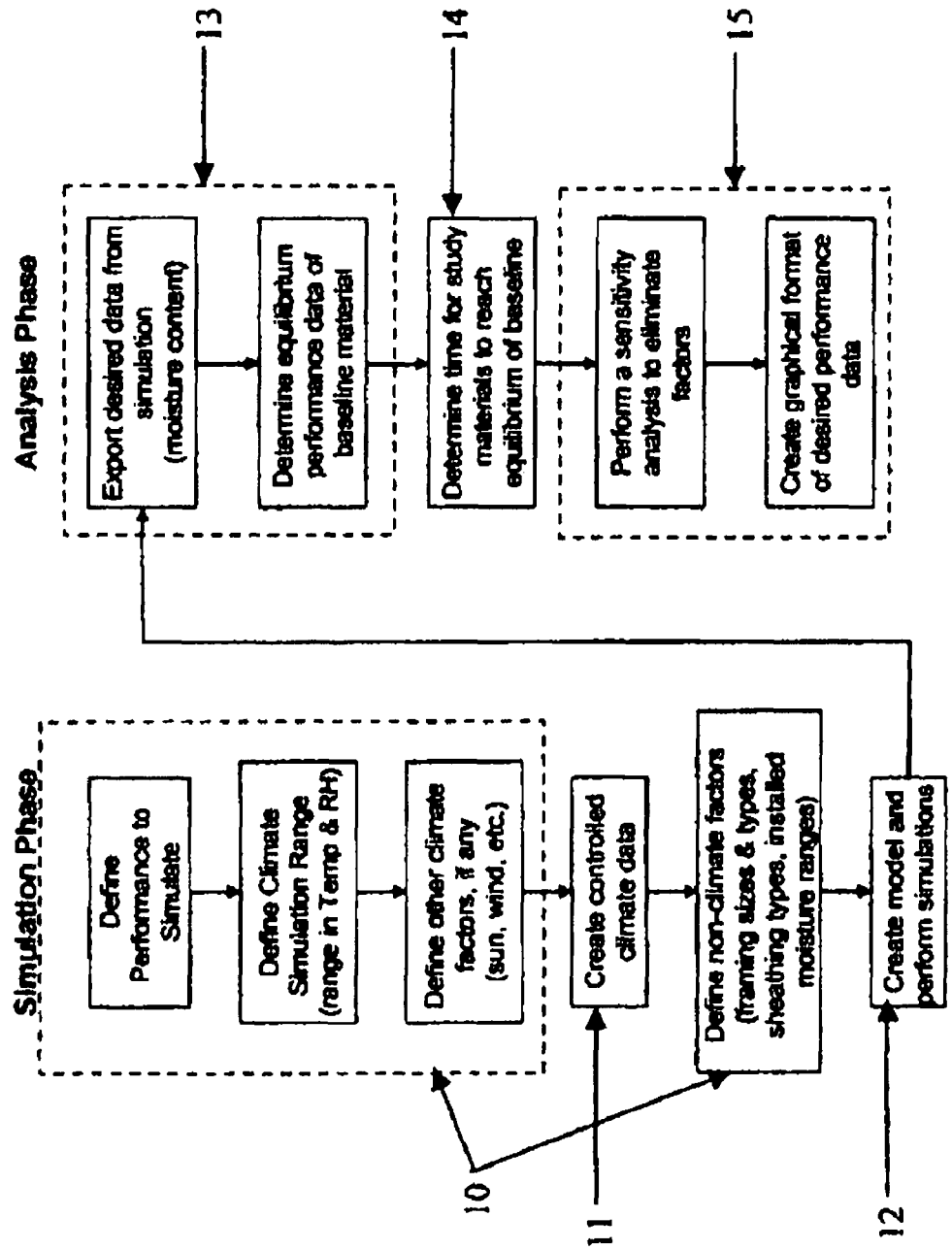
FIG. 1 is a graphical flow-chart of the method of the subject invention representing a simulation, analysis, and creation of a user guide.

FIG. 1 provides a graphical flow chart of the simulation and analysis method of the subject invention. The simulation phase of the method begins with the steps, designated by 10, of defining the performance characteristic(s) to be simulated of the building component of interest, the climate and non-climate factors to be investigated, and the range of values for the climate and non-climate factors. Given that the output of the transient hygrothermal simulation is primarily temperature, moisture content, and relative humidity, the preferred performance characteristics to be simulated would typically be selected from, but not be limited to, thermal performance (thermal resistance), water absorption, water desorption, water vapor transmission, corrosiveness, and fungal growth. The simulation phase next includes the step, designated by 11, of creating the simulated climate factor values, as described hereinafter. The simulation phase next includes the step, designated by 12, of inputting the defined performance characteristic(s) to be simulated, the created climate factor values, and the non-climate factor value(s) into a commercially available transient hygrothermal simulation software program to create a software model for performing simulations with the software program relating to the defined performance characteristic(s) wherein the climate and non-climate factors take on all combinations of values within the range of values or a selected combination of values within the range of values in accordance with accepted practices of design of experiments (DOE).

The analysis phase of the method involves the steps, designated by 13, of performing simulations with the software program to extract data from the software program based on the previously created software model relating to the defined performance characteristic(s) of the building component of interest and defining (e.g. determining) the threshold performance characteristic value (e.g. the equilibrium state) for the defined performance characteristic(s) of the building component at or above which the defined performance characteristic of the installed building component would be expected to affect (typically materially affect) the performance of the building component and/or other building component(s) in contact with or adjacent the building component, in a manner such as that described below. The analysis phase next includes the step, designated by 14, of comparing the performance data relating to the defined performance characteristic(s) of the building component of interest extracted from the simulation program to the threshold performance characteristic value (e.g. the equilibrium state) for the defined performance characteristic(s) of the building component to determine the length of time required for defined performance characteristic(s) of the building component to reach the threshold performance characteristic value (e.g. the equilibrium state). For simplification the step, designated by 15, of performing a sensitivity analysis can be included to eliminate factors and graphical formats can be developed showing the desired performance data.

In the method of the subject invention the defined performance characteristic(s) of a building component installed in a building structure (e.g. a building insulation material or building insulation material assembly installed in a wall cavity) is/are predicted as a function of time wherein the interior environment of the building is materially affected by the exterior environment, such as but not limited to the interior environment of an unfinished building structure, and not maintained at near-constant temperature and humidity, such as that normal for a fully enclosed building with a working HVAC system. In the method of the subject invention for predicting the transient hygrothermal behavior of an installed building component in a building structure where the interior environment of the building is materially affected by the exterior environment and not maintained at near-constant temperature and humidity such as that normal for a HVAC system, the climate factors (conditions) to be imposed on the building component(s) of the simulated building structure must be developed. The climate factors required for a commercially available hygrothermal simulation software program, such as the WUFI software package of Fraunhofer Institut Bauphysik, are exterior and interior temperature and relative humidity factors. This type of software program also accepts data such as rainfall, wind, and solar radiation factors. However, to make the method of the subject invention more generally applicable, for the purposes of the method of the subject invention, data relating to rainfall, wind, and solar radiation factors are eliminated (set to equal zero).

Preferably, the created climate factor values (climate conditions) of the method of the subject invention that are developed and inputted into the commercially available transient hygrothermal simulation software program to create a software model for performing simulations with the software program relating to one or more defined performance characteristics of a building component are accurate not only for a specific building location but can be accurate for many building locations. The method of the subject invention is intended to predict the transient hygrothermal behavior of building component(s) over a limited period of time, such as 10 to 30 days. Thus, in the method of the subject invention, it is acceptable to consider a given climate condition over such a limited period of time. Many building locations experience seasonal fluctuations in climate factors whereby the climate factors for different building locations at the same or different seasons of the year are substantially the same. Thus, since the climate factors are considered for only a limited period of time, such as 10 to 30 days, the method of the subject invention can be accurately used in many building locations by matching the developed climate factors with the seasonal climate factors occurring at a particular building location during the construction of the building. Unlike previous transient hygrothermal behavior simulations for building components where the developed climate factors are only used for the exterior environment of a building structure and a near-constant temperature and humidity normal for a HVAC system is used for the interior environment of a building structure, in the method of the subject invention, the developed climate factors appropriate for a particular building location are utilized for both the exterior environment and as a basis for the interior environment of the building structure.

With regard to temperature factors (conditions) over a period of time, e.g. 10 to 30 days, in the method of the subject invention, daily fluctuations in temperature are approximated: by choosing a mean daily temperature (e.g. 61° F.) for the period of time; by using a sine function to calculate actual hourly temperatures, based on a chosen range of temperatures (afternoon high minus night low); and by choosing the phase offset of the sine function so that the afternoon high temperature occurs at an appropriate time for the location and period of time, e.g. approximately 4:00PM. With regard to humidity factors (conditions), in the method of the subject invention to prevent simulated relative humidity conditions from occurring that are not physically possible, a mean relative humidity at an appropriate temperature is converted into absolute humidity, which is the total amount of water vapor in the air at that temperature. The temperature selected for creating humidity factors is typically the mean temperature chosen for developing the temperature factors. Over the simulation time period, the absolute humidity is then held constant as the temperature fluctuates per the sine functionality described above. The hourly relative humidity is calculated based on the absolute humidity and the temperature using standard psychromatic calculations. This methodology reflects that the relative humidity changes at different rates based on both the temperature and absolute humidity. If desired, but not necessary for the method of the subject invention, the effect of relative humidity on the magnitude of daily temperature variations could be utilized in connection with the developed climate factors. Since these developed climate factors are intended to simulate a building structure wherein the interior environment is not kept at a near-constant temperature and humidity normal for a HVAC system, in the method of the subject invention, the mean temperature and relative humidity of the interior environment of the building assembly are assumed to be the same as the mean temperature and relative humidity of the exterior environment. However, since the building envelope is at least partially constructed and in many instances mostly constructed, the method of the subject invention assumes that the interior climate factors do not fluctuate as much as the exterior climate factors fluctuate. For the purposes of the method of the subject invention it is assumed that the climate factors (temperature and relative humidity) of the interior environment fluctuate at a multiple of between 0.5 and 0.9 times the fluctuation of the exterior climate factors. In addition, to account for the time needed for heat to flow through the building envelope and bring the interior environment to equilibrium, it is assumed that the climate factors of the interior environment lag the climate factors of the exterior environment by an appropriate time lag, e.g. a time lag of between 2 and 4 hours. In a specific embodiment of the method of the subject invention, the climate factors were chosen to cover a time period of 13 days, the exterior daytime high temperature was chosen to occur at 4:00PM; and the climate factors for the interior environment were chosen to have a range 0.5 times the range of the exterior climate factors of temperature and humidity with a time lag of 3 hours.

The non-climatic factors inputted into the commercially available transient hygrothermal simulation software program to create a software model for performing simulations with the software program relating to one or more defined performance characteristics of a building component include characteristics of the building component, such as but not limited to the building component type (e.g. fiberglass insulation, cellulose insulation, or other type), as installed density (insulation density), and as installed moisture content ranges and characteristics of the building structure such as but not limited to framing sizes and types, cavity depth, exterior sheathing types. The non-climatic factors inputted into the commercially available transient hygrothermal simulation software program are selected in accordance with conventional practices employed in the industry.

Simulations are then performed relating to the defined performance characteristic of the building component of a selected building structure (such as an insulation building component installed in a wall cavity of a certain depth) with a software model of a commercially available hygrothermal simulation software program created by inputting the defined performance characteristic(s) of the building component of interest, the above developed climate factors (climate conditions), and non-climatic factors into the commercially available hygrothermal simulation software program. The evaluation of the performance of a building component is completed by comparing the data generated by the software model of the transient hygrothermal simulation program relating to a defined performance characteristic of the building component to threshold performance characteristic value (e.g. the equilibrium state) for the defined performance characteristic(s) of the building component to a defined threshold performance characteristic value at or above which the defined performance characteristic of the installed building component would be expected to affect (typically materially affect) the performance of the building component and/or other building component(s) in contact with or adjacent the building component. The results can then be presented in various forms, e.g. a table, graphic chart, a calculator, as a guide to insulation installers, home builders, building code officials, etc. with respect to the transient hygrothermal behavior of the one or more simulated performance characteristics of the building component.

In a performed example of the method of the subject invention, the output data generated by the created software model of the software program (the current WUFI software program) was the moisture content in a thermal insulation (the building component) and the temperature and relative humidity at the interface of the thermal insulation and the exterior wall sheathing. The objective of this specific example was to determine the time required for the moisture content of an installed damp spray-in fiberglass insulation system (building component) to reach a level where the damp spray-in fiberglass insulation could be covered with a vapor retarder such a polyethylene film (enclosed and sealed or substantially enclosed and sealed within a building assembly) without causing any material adverse consequences related to the moisture content of the installed building component. In this example, the performance characteristics used were water absorption and desorption.

In this specific example of the method of the subject invention, a threshold performance characteristic value (equilibrium moisture content value) for an installed damp spray-in fiberglass insulation (building component) was defined where the damp spray-in fiberglass insulation would introduce no or substantially no additional moisture related risk to the building structure such as moisture damage to or reduced performance of the damp spray-in fiberglass insulation and/or other building components in contact with or adjacent the damp spray-in fiberglass insulation. The defined threshold performance characteristic value for the damp spray-in fiberglass insulation was defined as the moisture content value of the damp spray-in fiberglass insulation where that moisture content of the damp spray-in fiberglass insulation equaled the moisture content of an installed, initially dry fiberglass insulation batt for a variety of appropriately selected climate factors and non-climate factors. It is an accepted industry practice to install fiberglass insulation batts in any frame construction, under any climate factors (climate conditions), and immediately cover the fiberglass insulation batts with any type of vapor retarder/barrier (e.g. kraft paper or polyethylene film) or interior sheathing (typically gypsum wall board). It is reasonable to assume that the fiberglass insulation batts are at equilibrium with the local climate at the time of installation and that following this practice does not introduce any additional moisture-related risk to a building structure. Therefore, any other fibrous insulation, which has the same moisture content as an initially dry fiberglass insulation batt at equilibrium with the local climate, also should not introduce any additional moisture related risk to the building structure. For this reason the initially dry fiberglass insulation batts were used in the simulation to determine the equilibrium moisture content to which the damp spray-in fiberglass insulation would need to dry. The drying time for the damp spray-in fiberglass insulation was determined by comparing the hourly moisture content of the damp spray-in fiberglass insulation to the equilibrium moisture content of the initially dry fiberglass insulation batt and calculating the time, from the installation of the damp spray-in fiberglass insulation, for the damp spray-in fiberglass insulation to reach the same moisture content as the initially dry fiberglass insulation batt. The drying time for the damp spray-in fiberglass insulation is a function of the local exterior climate (temperature and relative humidity), the interior climate (temperature and relative humidity), framing thickness, exterior sheathing type, insulation material type (fiberglass, cellulose, or others), installed insulation density, and installed moisture content. The drying time for the damp spray-in fiberglass insulation is also a function of other exterior climate factors such as wind, precipitation, solar radiation, building envelope air, and water-tightness, but these factors were not considered in the development of the method of the subject invention.

The result of applying the above method of analysis to the drying time for a damp spray-in fiberglass insulation is data that can be presented in various forms, e.g. in a table, in graphic chart, in a calculator, etc. as a guide to insulation installers, home builders, building code officials, etc. While the data can be presented in various forms, for the purposes of illustration, the data generated by the example of the method of the subject invention presented above has been presented herein in a graphical format along with a graph for determining the initial moisture content of damp spray-in fiberglass insulation.

Figure 2:
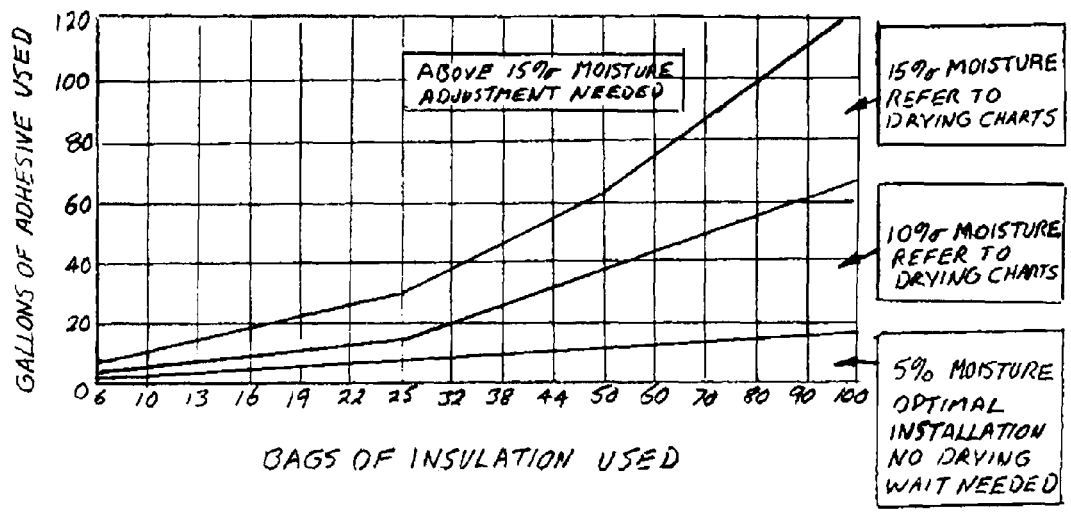
FIG. 2 is a graphical guide-chart produced in accordance with the method of the subject invention for determining: a) the as installed moisture content of damp spray-in fiberglass insulation without having to physically measure the moisture content of the installed damp spray-in fiberglass insulation in the field; and b) whether or not the as installed moisture content of the damp spray-in fiberglass insulation is at or above a threshold moisture content value where the moisture content of the damp spray-in fiberglass insulation would be expected to affect (typically materially and adversely affect) the performance of the building component and/or other building component(s) in contact with or adjacent the building component.

In FIG. 2, a graphical guide is provided for determining: the as installed moisture content of a damp spray-in fiberglass insulation without having to physically measure the moisture content of the installed damp spray-in fiberglass insulation in the field; and b) whether or not the as installed moisture content of the damp spray-in fiberglass insulation is above an equilibrium or threshold moisture content where the moisture content could materially affect the performance of the damp spray-in fiberglass insulation and/or other adjacent building components. As shown in FIG. 2, the as installed moisture content of the damp spray-in fiberglass insulation is presented, in ranges, as functions of the amount of adhesive used in gallons and the total amount of fibrous insulation used in bags of insulation having a known weight (e.g. 30 pound bags of Spider™ loose-fill fiberglass insulation marketed by Johns Manville). Thus, a user can easily determine the as installed moisture content of the damp spray-in fiberglass bags of fibrous insulation used. The graphical guide also indicates moisture contents for insulation by knowing the total amount of adhesive used in gallons and total number of the spray-in insulation where no drying is required (moisture contents of 10% or less by weight); moisture contents where drying is required (moisture contents between 10% to 15% by weight); and moisture contents where the moisture content is so high that adjustments in the application process are required (moisture contents in excess of 15% by weight).

Figure 3:
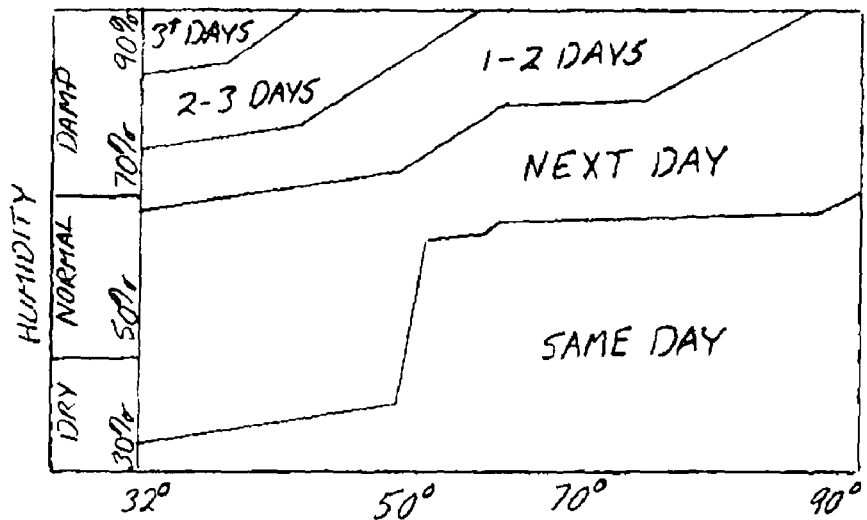
FIGS. 3 and 4 are graphical drying guide-charts for a damp spray-in fiberglass insulation that can be used with the graphical guide-chart of FIG. 2 to determine, as a function of time, when a damp spray-in fiberglass insulation, with a particular as installed moisture content, no longer equals or exceeds a threshold moisture content value at or above which the damp spray-in insulation can not be enclosed and sealed in a building structure (e.g. a building wall, ceiling, floor, or roof structure) without the possibly of adversely affecting (typically materially and adversely affecting) the performance of the damp spray-in insulation and/or other building component(s) in contact with or adjacent the damp spray-in insulation.
Figure 4:
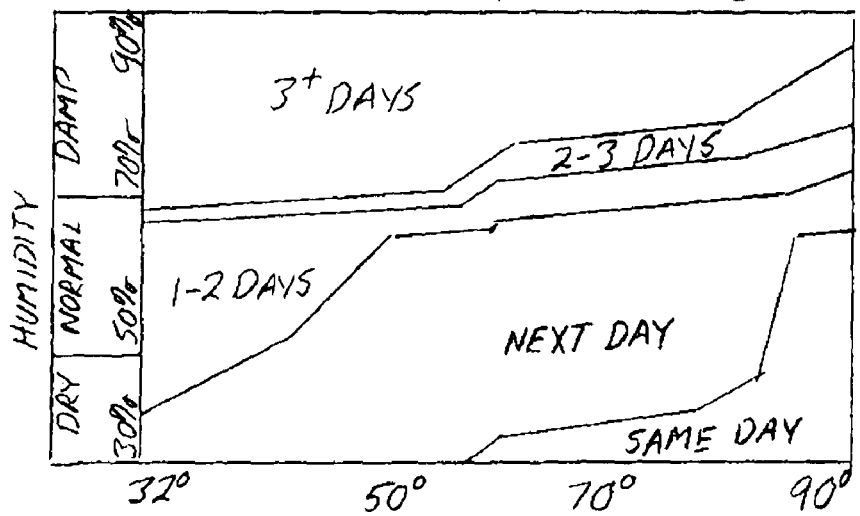

In FIGS. 3 and 4, the drying times for the damp spray-in fiberglass insulation are presented as functions of installed insulation moisture content for damp spray-in fiberglass insulation having as installed moisture contents between 10% and 15% by weight, then construction type, and finally by temperature and humidity. In FIG. 3, the chart displays the time, as a function of the actual daily mean temperature and mean relative humidity at a job site, until the moisture content of a damp spray-in fiberglass insulation reaches equilibrium (the time required for the damp spray-in fiberglass insulation to dry to the "installed dry fiberglass batt" threshold) for a 3.625 inch deep building structure cavity formed by 2×4 framing members. In FIG. 4, the chart displays the time, as a function of the actual daily mean temperature and mean relative humidity at a job site, until the moisture content of a damp spray-in fiberglass insulation reaches equilibrium (the time required for the damp spray-in fiberglass insulation to dry to the "installed dry fiberglass batt" threshold) for a 5.625 inch deep building structure cavity formed by 2×6 framing members. In the charts of both FIGS. 3 and 4, the drying times of the charts are displayed in ranges that are meaningful to the insulation installers, homebuilders, building code officials, or other users.

Figure 5:
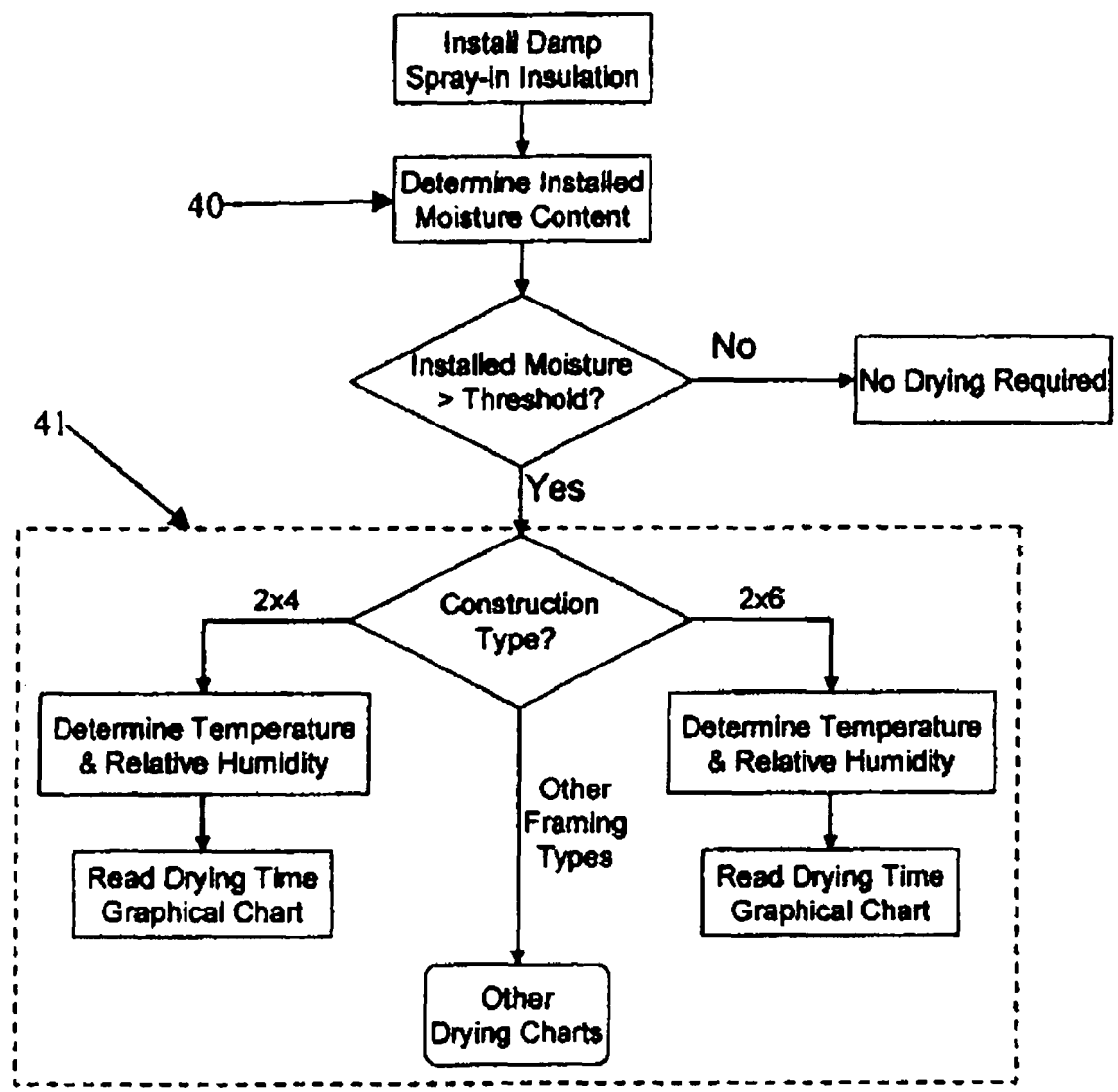
FIG. 5 is a graphical flow-chart representing how the information obtained from the method of the subject invention could be utilized at a job site by an insulation installer, homebuilder, code official, or other user.

FIG. 5 provides a graphical flow-chart of how the information resulting from the above example of the simulation and analysis method of the subject invention can be utilized by an insulation installer, home builder, code official, or other user. After a damp spray-in fiberglass insulation is installed, the step, designated by 40, of determining the as installed moisture content of the damp spray-in fiberglass insulation is carried out by determining the amounts of adhesive and insulation used and consulting the graphic chart of FIG. 2. If the as installed moisture content of the damp spray-in fiberglass insulation is less than or equal to the equilibrium or threshold moisture content, the user knows that the damp spray-in fiberglass insulation does not require any additional drying time before being covered by an interior sheathing or water vapor retarder. If the as installed moisture content of the damp spray-in fiberglass insulation is greater than the equilibrium or threshold moisture content, the steps designated 41 in FIG. 5 are followed. A chart, such as the charts of FIGS. 3 and 4, is consulted that corresponds to the framing type of the building structure in which the damp spray-in fiberglass insulation is installed and, based on the actual daily mean temperature and mean relative humidity at the job site, the drying time for the as installed moisture content of the insulation to reach the equilibrium moisture content is read off of the chart.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of constructing a building based on predicting the transient hygrothermal behavior of an installed building component in the building during construction, wherein an interior environment of the building is not controlled by a system during construction and is thus materially affected by an environment exterior of the building, comprising:

defining a performance characteristic of one building component that is affected by transient hygrothermal behavior of the one building component;

defining a threshold value for the performance characteristic of the one building component at which a second building component may be installed without adversely affecting the building;

defining exterior and interior climatic factors for creating exterior and interior climatic simulation ranges for a building wherein an interior environment of the building is materially affected by an environment exterior of the building, wherein the climatic factors comprise temperature factors and relative humidity factors, and the interior climatic factors are a function of the exterior climatic factors;

defining one or more non-climatic factors affecting the defined performance characteristic of the one building component;

inputting the defined performance characteristic, the exterior and interior climatic factors, and the one or more non-climatic factors into a commercially available transient hygrothermal simulation software program and creating a software model for performing simulations with the software program, which provides as an output predicted changes to the defined performance characteristic of the one building component, as a function of time, based on a selected initial as installed condition of the performance characteristic, selected exterior and interior climatic factors within the created exterior and interior climatic simulation ranges, and selected non-climatic factors of the one or more non-climatic factors;

performing simulations with the software program, based on the created software model, to obtain output values, as a function of time, setting forth the changes to the performance characteristic that are based on: inputted initial as installed conditions of the performance characteristic, inputted exterior and the interior climatic factors within the exterior and the interior climatic ranges, and inputted non-climatic factors of the one or more non-climatic factors; and installing the second building component, after the predicted changing performance characteristic of the one building component reaches the threshold value of the performance characteristic, as provided at the output of the software program;

wherein the temperature factors for defining the exterior temperature climatic factors of the exterior climatic range are defined by selecting a mean exterior temperature for an exterior climate, selecting an exterior temperature range for the exterior climate, and using a sine function to calculate exterior temperatures within the exterior temperature range over a 24 hour period;

wherein the temperature factors for defining the interior temperature climatic factors of the interior climatic range are defined by using the selected mean exterior temperature and an interior temperature range for an interior climate that is between 0.5 and 0.9 of the exterior temperature range, and using a sine function to calculate interior temperatures within the interior temperature range over a 24 hour period; and wherein the relative humidity factors for defining the exterior and interior relative humidity factors of the exterior and interior climatic ranges are defined by selecting a mean relative humidity at a selected temperature, converting the mean relative humidity to an absolute humidity which is then held constant as the exterior and interior temperatures vary over the period of time in accordance with the sine functions, and calculating external and internal relative humidities over the period of time based on the absolute humidity and the external and the internal temperatures over the period of time using standard psychrometric calculations.

2. The method according to claim 1, wherein:
the mean exterior temperature and the exterior temperature range for the exterior climate are selected to be the mean exterior temperature and the exterior temperature range for a period of 10 to 30 days.

3. The method according to claim 1, wherein:
the exterior and interior temperatures are calculated hourly over the 24 hour period and a phase change offset is chosen for the sine functions to reach a high external temperature at a first time for the exterior climate and a second time, later than the first time for the interior climate.

4. The method according to claim 3, wherein:
the first time for the exterior climate is between about 3:00PM and about 5:00PM and the second time for the interior climate is between 6:00PM and 8:00PM.

5. The method according to claim 3, wherein:
the first time for the exterior climate is approximately 4:00PM and the second time for the interior climate is between 6:00PM and 8:00PM.

6. The method according to claim 1, wherein:
the mean relative humidity is selected at the mean exterior temperature.

7. The method according to claim 1, wherein:
the defined performance characteristic is moisture content.

8. The method according to claim 1, wherein the second building component is installed in contact with or adjacent the one building component.

9. A method for constructing a building based on predicting and communicating transient hygrothermal behavior of an installed building component in a building wherein an interior environment of the building is not controlled by a HVAC system during construction involving the installed building component and thus the interior environment is materially affected by an environment exterior of the building, comprising:

defining a performance characteristic of one building component that is affected by transient hygrothermal behavior of the one building component;

defining exterior and interior climatic factors for creating exterior and interior climatic simulation ranges for a building wherein an interior environment of the building is materially affected by an environment exterior of the building, wherein the climatic factors comprise temperature factors and relative humidity factors, and the interior climatic factors are a function of the exterior climatic factors;

defining one or more non-climatic factors affecting the defined performance characteristic of the one building component;

inputting the defined performance characteristic, the exterior and interior climatic factors, and the one or more non-climatic factors into a transient hygrothermal simulation software program and creating a software model for performing simulations with the software program, which predicts changes in the defined performance characteristic of the one building component, as a function of time, based on a selected initial as installed condition of the performance characteristic, selected exterior and interior climatic factors within the created exterior and interior climatic simulation ranges, and selected non-climatic factors of the one or more non-climatic factors;

defining a threshold performance characteristic value at or above which, upon installation of a second building component, the defined performance characteristic of the one building component would be expected to affect the performance of the one building component and/or another building component in contact with or adjacent the one building component;

performing simulations with the software program, based on the created software model, to generate output values, as a function of time, setting forth the changes to the defined performance characteristic that are based on: inputted initial as installed conditions of the performance characteristic, inputted exterior and the interior climatic factors within the exterior and the interior climatic ranges, and inputted non-climatic factors of the one or more non-climatic factors;

comparing the generated output values to the threshold performance characteristic value to predict and communicate performance of the building component, as a function of time, for the inputted initial condition of the performance characteristic, the inputted exterior and interior climatic factors within the exterior and interior climatic ranges, and the inputted non-climatic factors; and installing the second building component after the predicted performance characteristic is below the threshold performance characteristic value;

wherein the temperature factors for defining the exterior temperature climatic factors of the exterior climatic range are defined by selecting a mean exterior temperature for an exterior climate, selecting an exterior temperature range for the exterior climate, and using a sine function to calculate exterior temperatures within the exterior temperature range over a 24 hour period;

wherein the temperature factors for defining the interior temperature climatic factors of the interior climatic range are defined by using the selected mean exterior temperature and an interior temperature range for an interior climate that is between 0.5 and 0.9 of the exterior temperature range, and using a sine function to calculate interior temperatures within the interior temperature range over a 24 hour period; and wherein the relative humidity factors for defining the exterior and interior relative humidity factors of the exterior and interior climatic ranges are defined by selecting a mean relative humidity at a selected temperature, converting the mean relative humidity to an absolute humidity which is then held constant as the exterior and interior temperatures vary over the period of time in accordance with the sine functions, and calculating external and internal relative humidities over the period of time based on the absolute humidity and the external and the internal temperatures over the period of time using standard psychrometric calculations.

10. The method according to claim 9, including:

communicating results of the comparison of the generated output values to the threshold performance value in graphical form.

11. The method according to claim 9, wherein:

the defined performance characteristic is moisture content; and the threshold performance characteristic value is a moisture content of the building component when the moisture content of the building component is substantially in equilibrium with a moisture content of a surrounding environment.

12. The method according to claim 9, wherein:

the performance characteristic is selected from a group consisting of: thermal performance, acoustical performance, water absorption, water desorption, water vapor transmission, corrosiveness, and fungal growth.

13. The method according to claim 9, wherein:

the mean exterior temperature and the exterior temperature range for the exterior climate are selected to be the mean exterior temperature and the exterior temperature range for a period of 10 to 30 days.

14. The method according to claim 9, wherein:

the exterior and interior temperatures are calculated hourly over the 24 hour period and a phase change offset is chosen for the sine functions to reach a high external temperature at a first time for the exterior climate and a second time, later than the first time for the interior climate.

15. The method according to claim 14, wherein:

the first time for the exterior climate is between about 3:00PM and about 5:00PM and the second time for the interior climate is between 6:00PM and 8:00PM.

16. The method according to claim 14, wherein:

the first time for the exterior climate is approximately 4:00PM and the second time for the interior climate is between 6:00PM and 8:00PM.

17. The method according to claim 9, wherein:

the mean relative humidity is selected at the mean exterior temperature.

* * * * *